United States Patent [19]
Yancey

[11] 3,723,337
[45] Mar. 27, 1973

[54] HYDROTHERMAL PROCESS FOR GROWING CRYSTALS HAVING THE STRUCTURE OF BERYL IN HIGHLY ACID CHLORIDE MEDIUM

[75] Inventor: Paul Joseph Yancey, San Diego, Calif.

[73] Assignee: Union Carbide Corporation, New York, N.Y.

[22] Filed: Aug. 3, 1970

[21] Appl. No.: 67,676

Related U.S. Application Data

[63] Continuation of Ser. No. 774,180, Nov. 7, 1968, abandoned.

[52] U.S. Cl............252/301.4 F, 106/42, 23/301 SP, 23/304, 23/305
[51] Int. Cl...........................C09k 1/54, B01j 17/00
[58] Field of Search.........252/301.4 F, 62.58, 62.59; 106/42; 23/295, 301, 304, 305

[56] References Cited

UNITED STATES PATENTS

| | | | |
|---|---|---|---|
| 3,341,302 | 9/1967 | Flanigen et al. | 23/301 |
| 3,567,643 | 3/1971 | Flanigen et al. | 106/42 |
| 3,234,135 | 2/1966 | Ballman et al. | 252/62.58 |
| 3,567,642 | 3/1971 | Flanigen | 106/42 |

OTHER PUBLICATIONS

Chemical Abstracts, Vol. 41 p. 680 40 h Herbert Smith Memorial Lecture "Journal of Gemology," Vol. pages 88-95, (1961).

*Primary Examiner*—Earl C. Thomas
*Assistant Examiner*—J. Cooper
*Attorney*—Paul A. Rose, Thomas I. O'Brien, Leo A. Plum and Harrie M. Humphreys

[57] ABSTRACT

A hydrothermal process for growing relatively large macro-crystals having the structure of beryl. Growth takes place on seed crystals from an aqueous medium which has a chloride ion concentration of at least 4 molar and contains sufficient hydrochloric acid to give a final pH of not greater than 0.1.

6 Claims, No Drawings

HYDROTHERMAL PROCESS FOR GROWING CRYSTALS HAVING THE STRUCTURE OF BERYL IN HIGHLY ACID CHLORIDE MEDIUM

This application is a continuation of application Ser. No. 774,180, filed Nov. 7, 1968, now abandoned.

This invention relates to a process for growing crystals having the structure of beryl. More particularly, it relates to a process for growing large single crystals having the structure of beryl of a size suitable for scientific and commercial uses from seeds in highly acidic aqueous chloride media at elevated temperatures and pressures.

Beryl, which is the only ore of beryllium, is a crystal having the ideal composition $3.0BeO \cdot 1.0Al_2O_3 \cdot 6.0SiO_2$, and is commonly found in its natural form in granite. Its crystal structure is a hexagonal system, and it is usually found in the form of long, six-sided prisms. The framework of the crystal structure of beryl is a complex cyclosilicate ring structure in which the silicon atoms are at the centers of a group of four oxygen atoms lying at the points of tetrahedra. These tetrahedral groups are linked together by the sharing of oxygen atoms in the rings having the composition $Si_6O_{18}$. The silica rings are joined together by aluminum atoms lying in the center of a group of six oxygen atoms, and by beryllium atoms in a similar group of four oxygen atoms. There are two molecules in each unit cell. Beryl ranges in Moh's hardness from 7.5 to 8, and in specific gravity from 2.63 to 2.85.

In addition to pure beryl, there are crystallographic analogs of beryl which are also valuable for scientific and commercial uses. The structure of these analogs is essentially the same as that of beryl, except for the presence of small amounts of materials other than the oxides of beryllium, silicon and aluminum which are present. For example, when small amounts of aluminum are isomorphously replaced by chromium in the beryl crystal structure, a green crystallographic analog of beryl is obtained which has essentially the same crystal structure of beryl. The product thus obtained is commonly known as emerald, although green gemstone emeralds do not necessarily always contain chromium.

When a metal ion other than those of aluminum, silicon and beryllium is incorporated in small amounts in the structure of beryl, the crystal which is thus obtained is commonly known in the art as a "doped" crystal. For example, when small amounts of chromium are incorporated in the crystal structure of beryl, the resulting emerald which is obtained could be considered to be a "chromium-doped" beryl. The ion thus incorporated in the crystal structure is usually referred to as a "dopant ion." For example, in the case of synthetically grown emerald or "chromium-doped" beryl the chromium which is incorporated in the synthetic crystal would be considered to be the "dopant" ion. Thus, the terms "doped" and "dopant" are well-known in the art and are intended to have the above defined and well known meanings whenever they appear hereafter in this application.

The principal object of the present invention is to provide a process for synthesizing single crystals having the structure of beryl, particularly beryl analogs doped with transition metal or rare earth metal ions.

Another object is to provide synthetic crystals or beryl structure, particularly those doped with transition metal or rare earth metal ions which are of a size suitable for use in the gemstone art and in solid-state devices.

Other and further objects and advantages of the present invention and the preferred embodiments thereof will become apparent and are disclosed in detail in the following description.

The process of the present invention represents an improvement over a previously known method for hydrothermal growth of beryl and analogs of beryl; namely, the method for carrying out such growth in an acidic halide medium described in British Patent 1,094,931. In particular, the process of the present invention provides increased yields of new growth, increased growth rate of beryl, and improved beryl crystal quality over those obtainable by the method of British Patent 1,094,931.

The present invention relates to a hydrothermal process for growing single crystals having the structure of beryl which comprises depositing a composition having the structure of beryl on a seed crystal from an aqueous reactant mixture which comprises (1) at least a major amount of (a) sources of oxides of beryllium, aluminum and silicon and (b) an aqueous medium which contains chloride ions in a concentration of at least 4 molar and contains sufficient hydrochloric acid to give a final (after the hydrothermal reaction has taken place) pH of not greater than 0.1 and, optionally, (2) a minor amount of sources of ions of one or more dopant transition metals and/or rare earth metals, the process being operated at a temperature of at least 400° C. and under a pressure of at least 6,000 pounds per square inch.

The transition metals useful in the process of this invention are those having atomic numbers from 21 through 31 inclusive; 39 through 49, inclusive; and 72 through 78 inclusive. The rare earth metals useful in the process of this invention are those having atomic numbers from 57 through 71, inclusive. A preferred group of transition metals comprises vanadium, chromium, manganese, iron, cobalt and nickel; these dopant elements impart highly desirable color characteristics to gemstone crystal products of this invention. A preferred group of rare earth metals comprises neodymium, samarium, gadolinium and europium because these dopant elements impart particularly desirable optical properties to crystals for use in solid-state devices.

Since the process of this invention is a hydrothermal process which is conducted at elevated temperatures and pressures, the process is most easily conducted in a sealed reaction vessel, autoclave or bomb of a type well known in the hydrothermal art of crystal synthesis. A variety of these reaction vessels are commercially available and are highly suitable for use in practice of this invention. The reaction vessel which is employed should be constructed of a high strength, corrosion-resistant steel or alloy in order to withstand the pressures and temperatures encountered in the present process. One such suitable material is a nickel alloy of a high strength having the composition (weight percent): 2.5% cobalt; 14.5 – 16.5% chromium; 15 – 17% molybdenum; 3 – 4.5% tungsten; 4 – 7% iron; maximum 1% silicon; maximum 1% manganese; maximum 0.8% carbon; balance nickel. The reaction vessel is also preferably provided with a liner or capsule of acid resistant metal, such as silver, platinum, gold or tantalum in order to avoid corrosion of the vessel by the highly acidic medium which is employed in the process of this invention. Several designs for high pressure reaction vessels are suitable for use in conducting the process of this invention, for example, those described by A. A. Ballman and R. A. Laudise ["Hydro-thermal Growth," *The Art and Science of Growing Crystals*, (1963) pp. 232–235], and a gold-lined or platinum-lined bomb similar to that described by Morey in *Amer. Miner.* Vol. 22, pp. 1,121 (1937). The bomb or capsule should remain tightly sealed throughout the reaction period in order to maintain the optimum conditions for satisfactory growth and crystal clarity.

The silicon, beryllium and aluminum oxide sources (nutrients) which are present in the aqueous acidic reactant mixture are usually present in the form of hydrous oxides of these metals. Any convenient source of the oxides of silicon may be employed as a starting material, such as for example, optical grade quartz crystal, fused quartz, $SiO_2$ porous glass and the like. The use of optical grade quartz crystal is preferred. Similarly as a source for the oxides of aluminum one may employ materials such as sapphire, gibbsite ($Al_2O_3 \cdot H_2O$), aluminum hydroxide which has been precipitated from solutions of aluminum salts such as aluminum nitrate and the like. Convenient sources of the oxides of beryllium are materials such as beryllium hydroxide [$Be(OH)_2$], beryllium oxide, and the like. Although the composition of the reactant mixture with respect to the oxides of silicon, beryllium and aluminum may vary over a wide range, a reactant mixture containing these oxides in amounts which closely approximate the stoichiometric amount of these oxides in the composition of the ideal beryl crystal ($3.0BeO \cdot 1.0Al_2O_3 \cdot 6.0SiO_2$) is preferred.

When doped beryl crystals are prepared according to the present process, the source of the transition metal or rare earth metal ion dopant which is present in the reactant mixture is a metal compound such as a transition metal or rare earth hydroxide, a transition metal or rare earth metal nitrate, a transition metal or rare earth metal oxide, a transition metal or rare earth metal chloride, a transition metal or rare earth metal sulfate and the like. The source of dopant ion may also be the elemental dopant metal.

Although it is theoretically possible to incorporate over 10 percent by weight of a transition metal or a rare earth metal ion dopant into the beryl structure, lower weight percentages of dopant are normally incorporated into the beryl crystal by the process of this invention. Depending primarily on the requirements dictated by the particular end use of the crystal being grown, the concentration of transition metal or rare earth metal ion dopant in the crystal product may vary from about 0.005 weight per cent to about 8 weight per cent, preferably 0.01 weight percent to 2 weight percent, based on the total weight of the crystal. When the dopant ion is chromium, a concentration of 0.1 to 2 weight percent is particularly preferred.

In order to provide an amount of transition metal or rare earth metal ion dopant sufficient to produce crystals containing dopants in amounts within the ranges of percentages set forth above, the reactant mixture should contain a metal ion concentration of from about 0.01 weight percent to about 11 weight percent, based on the weight of beryl equivalent to oxide in the nutrient of aluminum, silicon and beryllium in the initial charge. Preferably, the concentration of transition metal or rare earth metal ion from the compound is from 0.01 weight percent to 2 weight percent, based on the theoretical weight of beryl from the oxide sources. More than one transition metal or rare earth metal ion may be used simultaneously as a dopant in the initial charge.

The aqueous chloride medium employed in the process of this invention contains chloride ions in a concentration of at least 4 molar and has a final pH of not greater than 0.1. The term "final pH" means the pH of the reaction mixture employed in the process of this invention after the hydrothermal reaction has been completed and the reaction mixture has been cooled to 25° C. It is necessary to define the acidity of the reaction mixture in this manner because a certain amount of reaction takes place between the hydrochloric acid present and the sources of beryllium, aluminum, and silicon which reduces the hydrogen ion concentration present in solution prior to carrying out the hydrothermal reaction process.

The reactant mixture employed in the process of the present invention is most conveniently prepared by first placing the sources of oxides of beryllium, aluminum, and silicon and the seed crystal or crystals in the reaction vessel, and then adding thereto an aqueous solution containing hydrogen chloride or hydrogen chloride plus other sources of chloride ion, such as ammonium chloride. The amount of hydrogen chloride and other source of chloride ion should be sufficient to provide a total chloride ion concentration of at least 4 molar, and the amount of hydrogen chloride should be sufficient to provide a final pH of not greater than 0.1. A certain amount of reaction will then take place between the aqueous hydrogen chloride and the sources of oxides of beryllium, aluminum, and silicon. Some of this reaction may take place immediately upon addition of the aqueous solution, for example, a reaction between aluminum hydroxide and hydrochloric acid, while additional reaction will take place during the hydrothermal synthesis reaction at elevated temperature and pressure.

In a preferred form of the process of this invention the concentration of chloride ion in the aqueous reactant mixture is at least 8 molar.

In a particularly preferred embodiment of the process of the invention the aqueous reactant mixture includes only the sources of oxides of beryllium, aluminum, and silicon (and, optionally, sources of dopant ions) and aqueous hydrochloric acid, that is, the aqueous hydrochloric acid provides both the minimum concentration of chloride ion of 4 molar and the high acidity necessary to provide a final pH of not greater than 0.1.

It has also been found that when chromium is being used as the dopant ion, it is highly desirable that the acidic aqueous reactant mixture should be substantially free of fluoride ion, in order to avoid precipitation of metal fluorides such as chromium fluoride which are insoluble and form precipitates under the acidic conditions of the present process. The presence of insoluble metal fluoride salts causes inclusions and cloudiness in the resulting crystals which are obtained, hinders the incorporation of the chromium ion dopant into the crystal except as occluded particles, and affects the rate of growth adversely.

In practicing the process of the present invention the synthetic beryl or doped beryl is grown on a seed crystal located within the sealed reaction vessel. The nutrient oxides and dopant ions migrate to the region of the seed, and new growth crystallizes thereon. Although any crystal having the structure of beryl or other suitable substrate may be used as a seed, a seed crystal of natural or synthetic beryl or a beryl analog is usually employed. Normally, the reaction is continued until the new growth is thick enough to be cut from the original seed. This new growth may then be employed as a seed crystal in further subsequent reactions. In this way macro-crystals of beryl structure of only synthetic hydrothermal origin are obtained. This is particularly useful in preparing macro-crystals of beryl structure having high purity and uniform composition and structure. Large synthetic crystals may also be obtained by conducting a series of short-term runs wherein fresh oxide nutrient and solution are used in each run of the series. A highly favorable aspect of this invention is the ability to achieve and maintain favorable growth rates over extended periods of time. For example, an average growth rate of greater than 0.8 mm. per day in the length of an edge of a crystal has been maintained over a period of 7 days, and an average of as high as 0.6 mm. per day has been maintained over a period of 13 days.

Another favorable aspect of this invention is the ability to substantially confine growth of crystal having the structure of beryl to the seed, and to obtain single crystal growth on such seed or seeds which is substantially flawless and optically transparent. Spontaneous nucleation and twining on the surface of the seed are eliminated.

The present process for growing crystals having the structure of beryl is generally conducted at temperatures of from about 400° C. to about 700° C. and at pressures of from about 6,000 pounds per square inch to about 30,000 pounds per square inch. Although it may be difficult to determine with absolute accuracy the actual operating pressure for the high-pressure systems employed in the present process, the internal pressure within the reaction vessel can be calculated from known pressure-temperature-volume data on water when low concentrations of solutes are present. Knowing the volume of the reaction vessel, the volume of the reactant mixture and the reaction temperature, the reaction pressure can be most conveniently calculated by using the pressure-temperature-volume data for pure water published by G. C. Kennedy in *American Journal of Science*, Vol. 248, p. 540 (1950).

It should also be understood that the upper limits of temperature range and particularly the pressure range are dependent to a great degree on the equipment which is available, and that these upper limits might be extended if equipment could be designed to withstand the higher temperatures and pressures. With the equipment which is presently available, the reaction temperature is from about 400° C. to about 700° C., and the pressure is from about 6,000 pounds per square inch to about 30,000 pounds per square inch. A temperature of from 550° to 650° C. and a pressure from 15,000 pounds per square inch to 25,000 pounds per square inch is preferred.

It has also been found that the growth rate may be accelerated somewhat by maintaining a temperature differential between the upper and lower portions of the reaction vessel or bomb. This differential may be achieved by providing a separate heating element for the lower portion of the reaction vessel or bomb, and then positioning the reaction vessel and the heating element in a large furnace which is maintained at a temperature which is lower than that produced by the heating element. In this manner, a temperature differential is easily maintained by suitable control of the bomb and the furnace heaters. A temperature differential between the top and the bottom of the reaction vessel of from about 10° C. to about 100° C. may be employed. A differential of from 10° C. to about 50° C. is preferred.

It has also been found that the rate of growth may be affected by the geometry of the seed crystal and the oxide nutrient sources within the reaction vessel. For best results the seed crystal should be positioned at a point in the reaction vessel which is intermediate to the zone wherein the silica source is located and zone wherein the beryllium oxide and aluminum oxide sources are located. Throughout the reaction the seed crystal and all of the oxide sources are in intimate contact with the acidic aqueous reactant mixture. The relative distances between the silicon oxide source, the seed crystal or crystals, and the beryllium and aluminum oxide sources have not been found to be critical. An arrangement which has been found to be highly suitable for growing single crystals of good quality at relatively high growth rates is one in which the oxide sources of beryllium oxide and aluminum oxide are placed at the bottom of the reaction vessel, the silicon oxide source is suspended by means of a wire or a porous gauze basket of noble metal in the upper portion of the reaction vessel, and the seed crystal or seed crystals are suspended by means of a noble metal wire at a point in between.

It is also possible to employ multiple groups of oxide sources and seed crystals within a reaction vessel wherein individual sets of oxide sources and seeds are "stacked" in separate arrangements within said vessel and all are in contact with a common acidic aqueous reactant mixture. The number of sets which may be employed is determined primarily by the available volume of the reaction vessel. The "stacked" system is not a preferred method for carrying out the process of this invention.

When crystals prepared according to the process of this invention are removed from the reaction vessel after it has cooled, the surfaces of these crystals may be covered with other phases or impurities which formed within the autoclave during cooling. Although these phases or impurities are not substantial in quantity, any impurities may be removed before use of the crystal product as a gemstone or in a solid-state device by washing with hot or cold dilute acid solutions and water or by scraping the surfaces clean.

The crystals of beryl and doped beryl produced by the process of this invention often differ somewhat from the ideal stoichiometry for beryl, namely, $3.0BeO \cdot 1.0Al_2O_3 \cdot 6.0SiO_2$. The crystals of chromium doped beryl produced by the process of this invention are characterized by having refractive indices in the range of 1.57 to 1.58 and by exhibiting a brilliant red fluorescence when excited by radiation in the ultraviolet and visible violet and blue region of the electro-magnetic spectrum. However, the red fluorescence of the chromium doped beryl crystals of this invention is not as intense as the red fluorescence of chromium doped beryl produced by the process of British Patent 1,094,931.

A particular advantage of the single crystals of beryl structure of this invention is the utility of the doped crystals in solid-state applications. Such applications often require that the crystal be free of crystal imperfections and contain only a controlled amount of dopant ion or ions homogeneously distributed throughout the crystal structure and be substantially free of undesirable extraneous impurities, such as flux inclusions. Naturally-occurring crystals of beryl structure such as emeralds almost always contain at least small amounts of several impurity ions. In addition, the level of extraneous ions is often considerably out of the range desired for solid-state applications.

Following are examples of the practice of the invention which is hereinbefore described. In all of the following examples, the reactant mixture charge occupied about 50 volume percent of the total reactor (pressure vessel) volume.

EXAMPLE 1

This example illustrates the method and results of growing undoped beryl. A pressure vessel was charged with 2.7 grams beryllium hydroxide, 2.9 grams aluminum hydroxide, 6.7 grams crushed quartz, and an aquamarine seed. No dopant ion was supplied to the system. To this mixture 14 ml. of aqueous 12 molar hydrochloric acid was added and the vessel was sealed. The vessel was then heated and held to a temperature of 610° C for 11 days. The resulting growth on the aquamarine seed was 22.7 carats of perfectly clear, colorless, good-quality beryl.

EXAMPLE 2

This example illustrates the method and result of growing chromium doped beryl, or emerald. A pressure vessel was loaded as in Example 1, except that 0.30 gram of $CrCl_3 \cdot 6H_2O$ was added to the reactant mixture. One large aquamarine wafer was used as the seed material. In 13 days at temperature (about 600° C.) this seed grew 47.0 carats of excellent quality green emerald. The seed increased in thickness from 0.020 inches to 0.300 inches during this period.

EXAMPLE 3

The following examples illustrate variations in the method of growing emerald as set forth in Example 2:

a. The reaction vessel was loaded with the nutrient materials as noted in Example 2, but the concentration of the aqueous hydro-chloric acid solution in this run was 6 molar in acid. After 7 days at a temperature of 610° C. the aquamarine seed grew 31.6 carats of fair quality emerald.

b. The reaction vessel was loaded with 2.9 grams aluminum hydroxide, 6.7 grams quartz, 0.30 grams $CrCl_3 \cdot 6H_2O$ and 1.5 grams of sintered BeO rod, along with the aquamarine seed and 14 ml. of aqueous 12 molar HCl. In 8 days the seed grew 11.8 carats of good quality light green emerald.

c. A vessel was loaded with 1.99 grams $Be(OH)_2$, 2.3 grams $Al(OH)_3$, 6.0 grams quartz, 0.15 gram $CrCl_3 \cdot 6H_2O$, and 13.5 ml of aqueous 7 molar hydrochloric acid. During a period of 4 days at an average temperature of 585° C. the seeds grew 6.0 carats of good quality, light green emerald.

d. Seven reactors were each loaded with the reactant charge described in Example 2. One aquamarine wafer and one pure synthetic emerald seed were hung in each vessel and 14.1 ml of aqueous 12 molar hydrochloric acid was added. The reactors were heated and controlled at temperatures between 620° and 630° C. for 10 days. A total of 286.6 carats of chromium doped beryl were grown on the seeds during these runs.

EXAMPLE 4

This example illustrates the effect of chloride ion concentration in the process of this invention. A series of five runs was made in which each of five pressure vessels of identical dimensions was charged with a single aquamarine seed, all five seeds being of approximately the same weight and size, together with 2.7 grams of beryllium hydroxide, 2.9 grams aluminum hydroxide, 6.7 grams crushed quartz, 0.3 grams of $CrCl_3 \cdot 6H_2O$ and 14 ml. of aqueous hydrochloric acid of varying concentrations. All five reaction vessels were then heated for identical periods of 7 days. The results are summarized in the following table.

| Run | Seed weight (g.) Initial | Seed weight (g.) Final | Average vessel temp. Bottom | Average vessel temp. Top | Normality of HCl | Final pH | Growth quality | Color of new growth |
|---|---|---|---|---|---|---|---|---|
| 1 | 0.55 | 3.63 | 609 | 556 | 4 | 0.1 | Poor | Almost clear. |
| 2 | 0.65 | 6.98 | 608 | 540 | 6 | <0 | Fair | Very light green. |
| 3 | 0.62 | 6.18 | 610 | 547 | 8 | <0 | Excellent | Green. |
| 4 | 0.59 | 6.54 | 609 | 559 | 10 | <0 | ....do...... | Do. |
| 5 | 0.59 | 7.75 | 608 | 570 | 12 | <0 | ....do...... | Dark green. |

The above data show that at the minimum molarity of chloride ion (4 molar) and the maximum permissable final pH of 0.1 minimal growth of low quality chromium doped beryl was obtained, while at chloride ion concentrations of 8 molar or greater and at final pH's near zero, rapid growth of excellent quality chromium doped beryl was obtained.

EXAMPLE 5

This example compares the improved process of this invention with the prior process disclosed in British Patent 1,094,931.

Ten runs were carried out using the process of this invention, each run using the same size pressure vessel, seed material and quantities of reactants and temperatures employed in Example 4 except that 12 normal hydrochloric acid was used in all runs. An additional nine runs were carried out in the same manner except that 5 normal aqueous ammonium chloride was used in place of 12 normal hydrochloric acid. Five normal ammonium chloride is the preferred reaction medium disclosed in British Patent 1,094,931. All 19 reaction vessels were heated at the temperatures employed in Example 4 for identical periods of 13 days.

Growth of chromium doped beryl was obtained on all 19 seed crystals. For the 10 runs carried out using the process of this invention, all of the new growth was of excellent quality, the average amount of new growth on each seed was 29.4 carats, and the average thickness of new growth on the seed crystals was 5.50 mm. For the nine runs carried out using the process of British Patent 1,094,931 the new growth was of less good quality, the average new growth on each seed crystal was 17.5 carats, and the average thickness of new growth on the seed crystals was 3.65 mm.

EXAMPLE 6

The following examples illustrate the production of beryl crystals doped with a variety of metal ions. In these examples the loading procedure, reactants and reaction conditions were identical with those of Example 1 except for the addition of various sources of dopant ions.

a. To the charge specified in Example 1, 0.18 gram of $V_2O_5$ was added. The new beryl growth on the seed was analyzed by spectrographic methods and was found to contain greater than 0.10 weight percent vanadium as a dopant ion.

b. To the charge specified in Example 1, 0.20 gram of $MnO_2$ was added. The resulting new beryl growth was found to contain greater than 0.1 weight percent of manganese as a dopant ion.

c. To the charge specified in Example 1, 0.15 gram each of $MnO_2$ and $V_2O_5$ was added. The resulting new beryl growth was found to contain in excess of 0.1 weight percent each manganese and vanadium as dopant ions.

d. To the charge specified in Example 1, 0.143 gram of $Fe_2O_3$ was added. The resulting new beryl growth was found to contain greater than 0.1 weight percent iron as dopant ion.

What is claimed is:

1. A hydrothermal process for growing single crystals having the structure of beryl which comprises: depositing a composition having the structure of beryl on a seed crystal from an acidic aqueous reactant mixture consisting essentially of; (1) at least a major amount of (a) sources of oxides of beryllium, aluminum and silicon, and (b) a chloride solvent medium which contains chloride ions in a concentration of at least 4 molar and which consists essentially of sources of chloride ions and hydrochloric acid in an amount to give a final pH of not greater than 0.1, and (2) up to minor amounts of sources of one or more of the dopant metals vanadium, chromium, manganese, iron, cobalt, nickel, neodymium, samarium, gadolinium and europium; said process being carried out at a temperature of at least 400° C. and under a pressure of at least 6,000 pounds per square inch.

2. The process in accordance with claim 1 wherein said sources of oxides of beryllium, aluminum and silicon are present in amounts which provide substantially the stoichiometric amounts of beryllium, aluminum and silicon oxides in the composition of an ideal beryl crystal (3.0 BeO · 1.0 $Al_2O_3$ · 6.0 $SiO_2$).

3. The process in accordance with claim 1 wherein said acidic aqueous reactant mixture consists essentially of (a) sources of the oxides of beryllium, aluminum and silicon, (b) hydrochloric acid, and (c) minor amounts of sources of ions of one or more of the dopant metals vanadium, chromium, manganese and iron.

4. The process in accordance with claim 3 wherein said dopant metal is chromium.

5. The process in accordance with claim 3 wherein (1) said sources of oxides of beryllium and aluminum are disposed near the bottom of a closed reaction vessel, said sources of oxides of silicon are disposed near the top of said vessel, and said seed crystal has the structure of beryl and is supported between said sources of oxides of beryllium and aluminum and said sources of oxides of silicon, and (2) wherein the temperature at the bottom of said reaction vessel is at least 10° C. higher than the temperature at the top of said vessel.

6. The process in accordance with claim 5 wherein said aqueous reactant mixture is substantially free from fluoride ion and wherein said source of dopant metal is $CrCl_3 · 6 H_2O$ which is present in said reactant mixture in sufficient amount to supply from 0.01 to 2 weight percent chromium ion in said crystal based on the weight of ideal beryl crystal theoretically equivalent to the weight of aluminum, beryllium and silicon oxides present in said oxide sources.

* * * * *